E. J. SWANSON.
TEMPERATURE INDICATOR.
APPLICATION FILED SEPT. 21, 1914.
1,144,009.
Patented June 22, 1915.
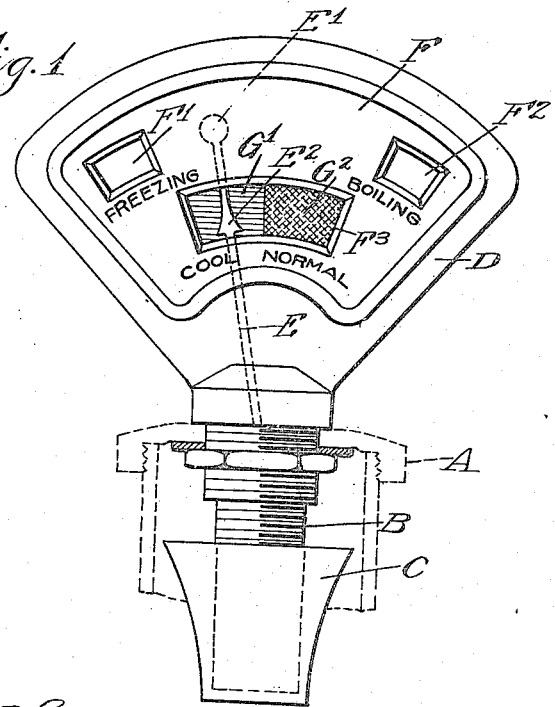
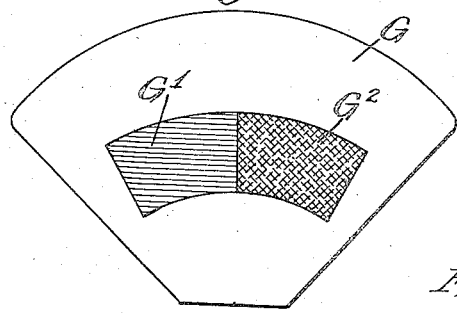
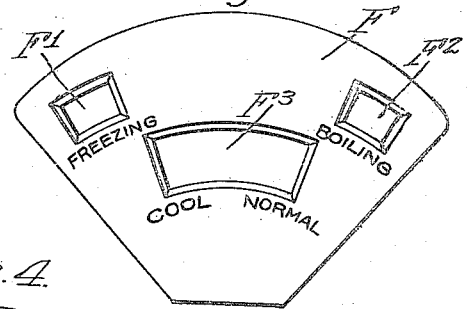
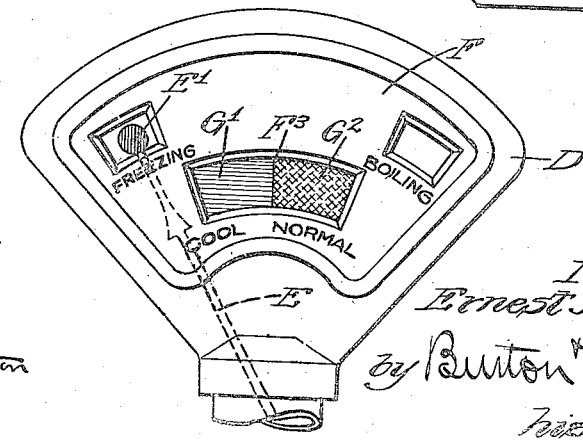

UNITED STATES PATENT OFFICE.

ERNEST J. SWANSON, OF CHICAGO, ILLINOIS, ASSIGNOR TO STEWART-WARNER SPEEDOMETER CORPORATION, OF CHICAGO, ILLINOIS, A CORPORATION OF VIRGINIA.

TEMPERATURE-INDICATOR.

1,144,009.  Specification of Letters Patent.  Patented June 22, 1915.

Application filed September 21, 1914. Serial No. 862,810.

*To all whom it may concern:*

Be it known that I, ERNEST J. SWANSON, a citizen of the United States, residing at Chicago, in the county of Cook and State of Illinois, have invented new and useful Improvements in Temperature-Indicators, of which the following is a specification, reference being had to the accompanying drawings, forming a part thereof.

This invention relates to temperature indicators and is particularly concerned with an improved form of indicating means therefor.

It consists of the features and elements described and shown in the drawings, as indicated by the claims.

In the drawings Figure 1 is a front elevation of a temperature indicator embodying this invention. Fig. 2 is a front elevation of the background plate of the indicating means. Fig. 3 is a front elevation of the apertured dial plate of the indicating means. Fig. 4 is a front elevation similar to Fig. 1 but showing the indicating needle in a different position.

The type of temperature indicator used for purposes of illustration is one which is particularly designed for use in connection with internal combustion engines, being intended to be mounted in the cooling water circuit, so as to indicate the temperature of the cooling water as it comes from the engine and thus indirectly indicate the condition of the engine itself as to temperature. When employed on automobile engines the device is usually mounted on the radiator cap, A, so that the body, B, of the instrument in which is housed the thermally-responsive element, not shown, may extend down into the water in the radiator, so as to be influenced by the temperature of such water. In the event that the cooling water level recedes somewhat below the bottom of the device, the body portion, B, will still remain immersed in warm water caught in the splash cup, C, which will be constantly filled and re-filled by the splashing of the water caused by motion of the vehicle. As the water in the upper portion of the radiator is the hottest water in the cooling circuit, having just come from the engine cylinders, its influence on the temperature indicator furnishes a very reliable indication of the condition of the engine itself.

The portion of the device which is visible above the radiator cap, A, consists of a sectoral casing, D, in which there is pivotally mounted an index member in the form of a needle, E, which, as will be understood, is mechanically connected to the thermally responsive element housed in the body portion, B, so that in response to temperature change, this index needle, E, will swing through the range permitted by the limits of the sectoral casing, D. For some uses there would be provided in the casing, D, a dial plate graduated in degrees of temperature, but for the purposes of the automobile driver, it is not essential or desirable that he be informed of the temperature in terms of degrees Fahrenheit, but rather that he learn directly from the position of the index member, E, the conditions of temperature under which his engine is operating. For this purpose therefore, the range of travel of the index member, E, is divided into four parts; namely, the normal range within which the engine is operating properly and efficiently, the cool range in which the engine is still operating but not as efficiently as it should by reason of excessive radiation from the cooling water; the range in the vicinity of the freezing point of water which might be reached after the engine had been standing still for some time in cold weather, and lastly the range in the vicinity of the boiling point of water which would be approached upon overheating of the engine due to insufficient radiation or over-loading. The present invention provides the automobile driver with means for telling at a glance in which of these temperature ranges his engine is, and furnishes such information both through the particular position of the index member, E, and through the particular color contrast which it forms with the background against which it is revealed in that position, as hereinafter described.

The casing, D, is provided with an apertured dial plate, F, mounted in front of the index member, E, provided, as shown in the drawing, with three apertures, $F^1$, $F^2$ and $F^3$, respectively. The aperture, $F^1$, corresponds to the range of temperature in the vicinity of freezing; the aperture, $F^2$, corresponds to temperatures in the vicinity of the boiling point of water; and the middle aperture, $F^3$, covers a range of temperatures within which the engine may be safely operated. But as safety and efficiency are not synonymous, this middle window, or aperture, F³, is divided into two sections by means of colored backgrounds, G¹ and G², carried by the back plate, G, which is positioned behind the plane of travel of the index member, E. The colored field, G¹, corresponds to the too cool range of temperature, while the differently colored field, G², corresponds to normal and efficient range of temperature.

In order to convey more sharply the suggestion of danger when the index member, E, moves into either of the limiting fields covered by the apertures, F¹ and F², the tip of the index needle, E, which is revealed at said windows is preferably enlarged to circular form at E¹ and is given a bright red color so as to show in sharp contrast against the white background portion of the back plate, G, and to avoid the appearance of this red portion of the index at the window, F³, the said window is offset from the other two so as to reveal a different portion of the index member, E, and the said portion indicated at E² in Fig. 1 may be white so as to contrast either with the blue field, G¹, of the cool region, or with the orange field, G², of the "normal" or efficiently warm range of temperature. By the employment of some such system of color contrast, the operator is given two sets of associations through which to interpret the reading of the temperature indicator and he can scarcely fail to note and understand the reading under such conditions.

I claim:

1. In an indicator having an index member movable in response to change of temperature, a dial plate mounted in front of said index, having a plurality of apertures corresponding to different ranges of temperature and positioned to reveal different portions of the index during the travel of the latter.

2. In an indicator having an index member movable in response to change of temperature, a dial plate mounted in front of said index, having a plurality of apertures corresponding to different ranges of temperature and positioned to reveal different portions of the index during the travel of the latter, said different portions of the index being differently colored.

3. In an indicator having an index member movable in response to change of temperature, a dial plate mounted in front of said index having a plurality of apertures corresponding to different ranges of temperature and positioned to reveal different portions of the index during the travel of the latter, said different portions of the index being differently colored; and a background plate mounted behind the plane of travel of the index and having differently colored portions positioned to show through the respective apertures of the dial plate to form different color contrasts with the index member.

4. In an indicator having an index member movable in response to change of temperature, a dial plate mounted in front of said index having a plurality of apertures corresponding to different ranges of temperature and positioned to reveal different portions of the index during the travel of the latter, said different portions of the index being differently colored, and a background plate mounted behind the plane of travel of the index and having differently colored portions positioned to show through the respective apertures of the dial plate to form different color contrasts with the index member; a plurality of such differently colored background sections being arranged to appear through one of the said apertures.

In testimony whereof, I have hereunto set my hand at Chicago, Ill., this 18th day of September, 1914.

ERNEST J. SWANSON.

Witnesses:
E. C. JAMISON,
J. G. GILMORE.